US009225283B2

(12) United States Patent
Morita et al.

(10) Patent No.: US 9,225,283 B2
(45) Date of Patent: Dec. 29, 2015

(54) MOTOR CONTROL DEVICE FOR SWITCHING PWM FREQUENCY TO USE THE SAME

(71) Applicant: FANUC CORPORATION, Minamitsuru-gun, Yamanashi (JP)

(72) Inventors: Yuuki Morita, Minamitsuru-gun (JP); Daisuke Tajima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 128 days.

(21) Appl. No.: 14/045,586

(22) Filed: Oct. 3, 2013

(65) Prior Publication Data
US 2014/0197772 A1   Jul. 17, 2014

(30) Foreign Application Priority Data

Oct. 4, 2012   (JP) ................................. 2012-222316

(51) Int. Cl.
*H02P 27/08*   (2006.01)
*H02P 29/00*   (2006.01)

(52) U.S. Cl.
CPC ............ *H02P 27/08* (2013.01); *H02P 29/0044* (2013.01); *H02P 29/0088* (2013.01); *H02P 2209/13* (2013.01)

(58) Field of Classification Search
CPC ..... G06F 1/206; H02P 27/08; H02P 29/0088; H02P 29/0044; H02P 2209/13
USPC ................... 318/503, 799, 471, 599; 700/299
See application file for complete search history.

(56) References Cited

U.S. PATENT DOCUMENTS

| | | | |
|---|---|---|---|
| 2007/0290650 A1* | 12/2007 | Muta | 318/799 |
| 2009/0288634 A1* | 11/2009 | Takizawa et al. | 123/349 |
| 2010/0052583 A1 | 3/2010 | Takamatsu et al. | |
| 2011/0193506 A1* | 8/2011 | Hayashi et al. | 318/400.12 |

FOREIGN PATENT DOCUMENTS

| | | |
|---|---|---|
| CN | 101934814 A | 1/2011 |
| CN | 102287891 A | 12/2011 |
| JP | 7177601 A | 7/1995 |
| JP | 970195 A | 3/1997 |
| JP | 1028397 A | 1/1998 |
| JP | 2004-082757 A | 3/2004 |
| JP | 2004166415 A | 6/2004 |
| JP | 2008245486 A | 10/2008 |
| JP | 2009201290 A | 9/2009 |
| JP | 2010-246207 A | 10/2010 |
| JP | 2010246207 A | 10/2010 |
| JP | 2011125121 A | 6/2011 |
| JP | 2012126241 A | 7/2012 |

* cited by examiner

*Primary Examiner* — Shawki S Ismail
*Assistant Examiner* — Muhammad S Islam
(74) *Attorney, Agent, or Firm* — Hauptman Ham, LLP

(57) ABSTRACT

A motor control device includes an inverter, a power device temperature obtaining unit, a motor temperature obtaining unit, a power device temperature determination level storage unit, a motor temperature determination level storage unit, a PWM frequency storage unit that stores at least two PWM frequencies including a high PWM frequency a low PWM frequency, a power device temperature determining unit that determines whether or not a temperature of a power device is equal to or higher than a power device temperature determination level, a motor temperature determining unit that determines whether or not a temperature of a motor is equal to or higher than the motor temperature determination level, and a PWM frequency selecting unit that selects a PWM frequency to be given as a command to the inverter.

3 Claims, 8 Drawing Sheets

MOTOR CONTROL DEVICE FOR SWITCHING PWM FREQUENCY TO USE THE SAME

This application is a new U.S. patent application that claims benefit of JP 2012-222316, filed on Oct. 4, 2012, the content of JP 2012-222316 is incorporated herein by reference.

FIELD OF THE INVENTION

The present invention relates to a motor control device, and in particular to a motor control device that switches a PWM frequency in order to use the switched PWM frequency.

BACKGROUND OF THE INVENTION

In a motor control device, higher precision, larger output, and a smaller size is being sought, however there is a problem of heat generation of power devices and a motor. To solve this problem, a new cooling technique in a hardware aspect has been developed.

However, because of an operational environment and an operational condition, the cooling technique in the hardware may not be able to suppress heat generation sufficiently. In most motor control devices, an overheat level is set for power devices and a motor to prevent breakage due to heat generation. A motor control device is controlled so as to be stopped when a temperature of any of the power devices or the motor exceeds the overheat level (for example, Patent Literature 1).

However, in machine tools for example, stopping a motor control device leads to stopping of a production line. For this reason, a technique of suppressing heat generation is necessary so that a motor control device can be operated for a long time at a temperature that does not exceed an overheat level.

For such need, there is proposed a driving device of an alternating current (AC) motor that selects a PWM frequency on the basis of a temperature state of a switching device of an inverter (for example, Patent Literature 2). The term "PWM frequency" indicates a frequency of a pulse signal in a PWM control method. A conventional control device is a control device of an AC motor that controls an applying voltage by an inverter including electric power semiconductor switching devices. The conventional control device includes a temperature detecting unit, a PWM modulating unit, a PWM mode selecting unit, and a carrier wave controlling unit. The temperature detecting unit detects a device temperature of the electric power semiconductor switching device. The PWM modulating unit controls a pulse width modulation voltage that is applied to the AC motor from the inverter, on the basis of a phase voltage command and a carrier wave. The PWM mode selecting unit selects non-synchronization PWM when a device temperature is equal to or lower than a predetermined temperature. The PWM mode selecting unit selects synchronization PWM when a device temperature is higher than the predetermined temperature.

Next, operation of the conventional control device is described by using a flowchart of FIG. 1. At the step S2000, a device temperature Tsw is obtained. Next, at the step S2100, the device temperature Tsw is compared with a predetermined temperature T0. When the device temperature Tsw is higher than the predetermined temperature T0, the control device selects synchronization PWM at the step S2500. When the device temperature Tsw is equal to or lower than the predetermined temperature T0, the control device selects non-synchronization PWM at the step S2600. In this manner, synchronization PWM control or non-synchronization PWM control is selected on the basis of a device temperature Tsw. Thereby, when a device temperature is desired to be decreased, synchronization PWM control is performed to suppress a rise in a device temperature, and when a rise in a device temperature does not need to be suppressed, non-synchronization PWM control is performed to prevent generation of electromagnetic noise that is caused by synchronization PWM.

Patent Literature 1: JP-A-2004-82757
Patent Literature 2: JP-A-2010-246207

In the conventional control device, a PWM frequency is controlled by determining of a temperature of the electric power switching device (power device) used in the inverter. However, a temperature of a motor is not a target of control. A temperature of the motor tends to, on the contrary, rise when a PWM frequency is decreased. Thus, according to the conventional control device, decreasing a PWM frequency can prevent a rise in a temperature of the power device, but on the contrary causes a rise in temperature of the motor.

SUMMARY OF THE INVENTION

A motor control device according to an embodiment of the present invention includes: an inverter that inverts a DC voltage into an AC voltage at a specified PWM frequency by PWM control using a power device to apply the AC voltage to a motor; a power device temperature obtaining unit that obtains a temperature of the power device of the inverter; a motor temperature obtaining unit that obtains a temperature of the motor; a power device temperature determination level storage unit that stores a power device temperature determination level; a motor temperature determination level storage unit that stores a motor temperature determination level; a PWM frequency storage unit that stores at least two PWM frequencies including a high PWM frequency higher than the specified PWM frequency, and a low PWM frequency lower than the specified PWM frequency; a power device temperature determining unit that determines whether or not the temperature of the power device is equal to or higher than the power device temperature determination level; a motor temperature determining unit that determines whether or not the temperature of the motor is equal to or higher than the motor temperature determination level; and a PWM frequency selecting unit that selects a PWM frequency to be given as a command to the inverter, from the specified PWM frequency and the at least two frequencies on the basis of determination results of the power device temperature determining unit and the motor temperature determining unit.

A motor control device according to an embodiment of the present invention is configured such that when the temperature of the power device is lower than the power device temperature determination level, and the temperature of the motor is lower than the motor temperature determination level, the PWM frequency selecting unit selects the specified PWM frequency as the PWM frequency to be given as the command to the inverter.

A motor control device according to an embodiment of the present invention is configured such that when the temperature of the power device is lower than the power device temperature determination level, and the temperature of the motor is equal to or higher than the motor temperature determination level, the PWM frequency selecting unit selects the high PWM frequency as the PWM frequency to be given as the command to the inverter.

A motor control device according to an embodiment of the present invention is configured such that when the temperature of the power device is equal to or higher than the power device temperature determination level, and the temperature of the motor is lower than the motor temperature determination level, the PWM frequency selecting unit selects the low PWM frequency as the PWM frequency to be given as the command to the inverter.

A motor control device according to an embodiment of the present invention is configured such that when the temperature of the power device is equal to or higher than the power device temperature determination level, and the temperature of the motor is equal to or higher than the motor temperature determination level, the PWM frequency selecting unit selects the specified PWM frequency as the PWM frequency to be given as the command to the inverter, and creates a signal for generating a warning.

A motor control device according to another embodiment of the present invention is configured so as to further include: a power device temperature overheat determination level storage unit that stores a power device temperature overheat determination level; a motor temperature overheat determination level storage unit that stores a motor temperature overheat determination level; a power device temperature overheat determining unit that determines whether or not the temperature of the power device is equal to or higher than the power device temperature overheat determination level; and a motor temperature overheat determining unit that determines whether or not the temperature of the motor is equal to or higher than the motor temperature overheat determination level, wherein on the basis of determination results of the power device temperature overheat determining unit and the motor temperature overheat determining unit, the PWM frequency selecting unit stops giving, to the inverter, the command for PWM frequency setting when the temperature of the power device is equal to or higher than the power device temperature overheat determination level, or when the temperature of the motor temperature is equal to or higher than the motor temperature overheat determination level.

A motor control device according to another embodiment of the present invention is configured so as to further include: a first difference calculating unit that calculates a power device temperature difference that is a difference between the temperature of the power device and the power device temperature determination level; and a second difference calculating unit that calculates a motor temperature difference that is a difference between the temperature of the motor and the motor temperature determination level, wherein when the power device temperature difference is equal to or higher than the motor temperature difference, the PWM frequency selecting unit selects the low PWM frequency, and when the power device temperature difference is lower than the motor temperature difference, the PWM frequency selecting unit selects the high PWM frequency.

According to the present invention, heat generation of an entire motor control device can be suppressed by controlling PWM frequency on the basis of a temperature of a power device and a temperature of a motor. Accordingly, long time operation is possible while avoiding overheat and making the best use of the motor control device.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

In the following, a motor control device according to the present invention will be described with reference to the drawings. However, the technical scope of the present invention is not limited to embodiments of the motor control device, and covers the invention described in claims and equivalents thereof.

First Embodiment

Figure 1:
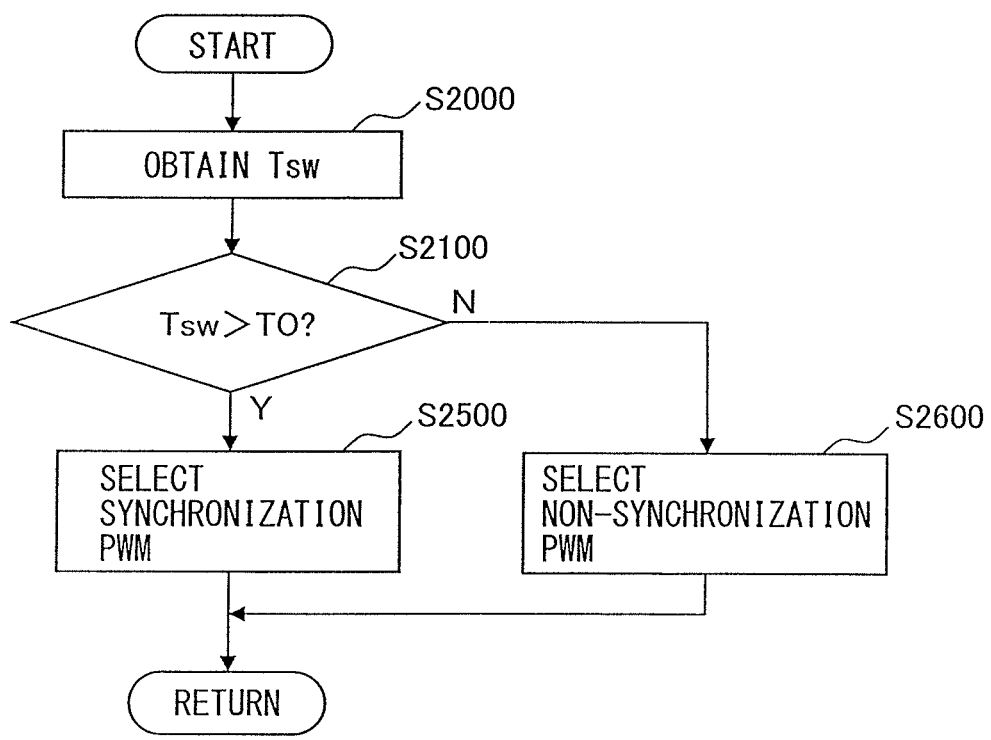
FIG. 1 is a flowchart for describing operation of a control device of a conventional AC motor.
Figure 2:
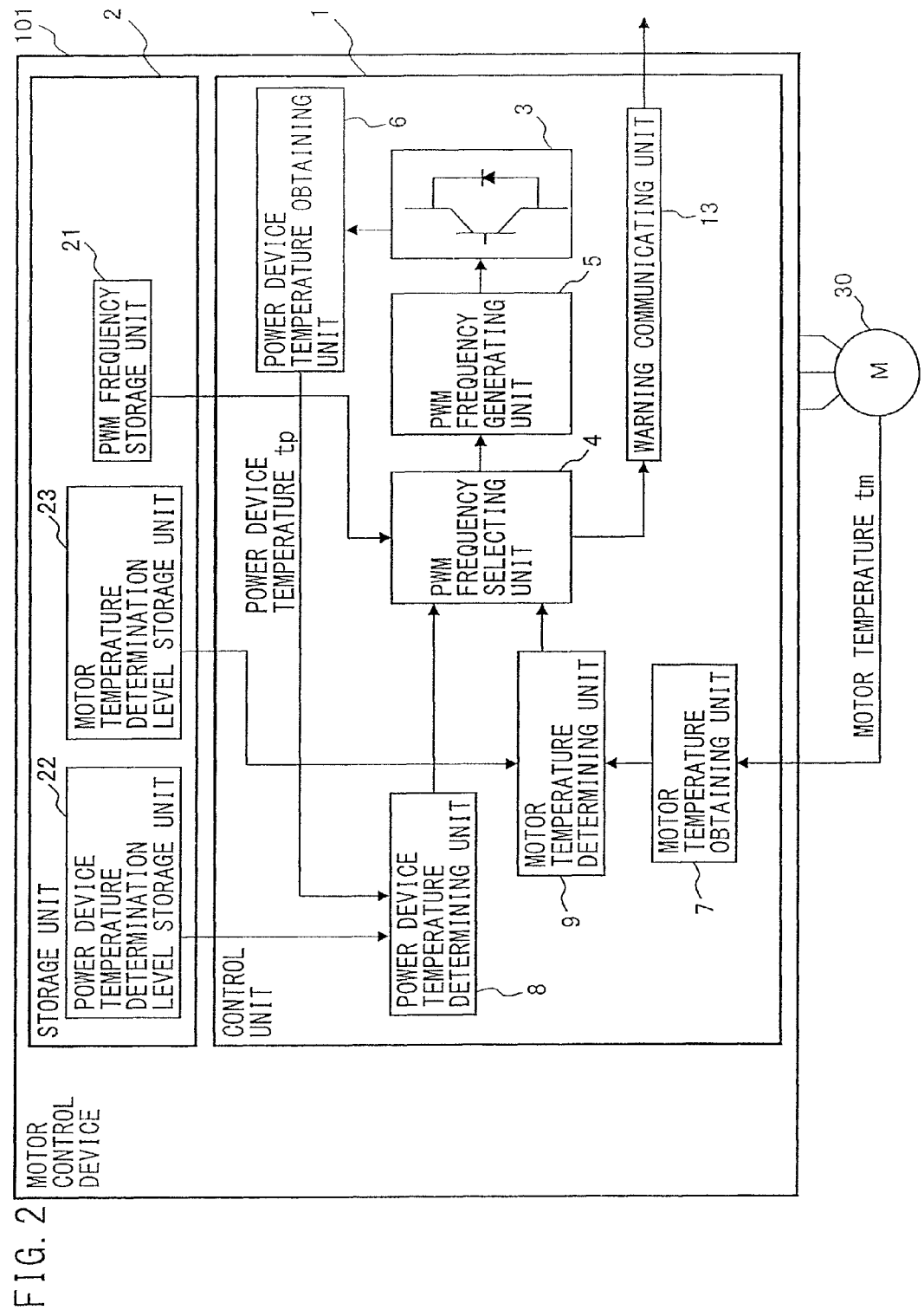
FIG. 2 illustrates a configuration of a motor control device according to a first embodiment of the present invention.

First, the motor control device according to a first embodiment of the present invention is described. FIG. 2 illustrates a configuration of the motor control device according to the first embodiment of the present invention. The motor control device 101 according to the first embodiment of the present invention includes a control unit 1 and a storage unit 2. The control unit 1 includes an inverter 3, a PWM frequency selecting unit 4, a PWM frequency generating unit 5, a power device temperature obtaining unit 6, a motor temperature obtaining unit 7, a power device temperature determining unit 8, a motor temperature determining unit 9, and a warning communicating unit 13.

The storage unit 2 includes a PWM frequency storage unit 21, a power device temperature determination level storage unit 22, and a motor temperature determination level storage unit 23.

The inverter 3 inverts a direct current (DC) voltage into an AC voltage of a specified PWM frequency by PWM control using a power device. The inverter 3 applies the inverted AC voltage to a motor 30.

The power device temperature obtaining unit 6 obtains a temperature of the power device of the inverter 3. Specifically, the power device temperature obtaining unit 6 obtains the temperature of the power device by directly detecting the temperature of the power device, or estimating the temperature of the power device from an electric current flowing in the power device. In one example, a temperature at a position near a connection part between a radiator of an amplifier and the power device can be obtained by using a thermistor. In another example, a temperature of the power device can be calculated by adding following two estimated values. One of the values is estimated from heat generation by a loss proportional to an electric current and the number of times of switching, and from a thermal time constant of a radiator unit of the amplifier. The other of the values is a rise amount estimated from heat generation by a loss proportional to an electric current and the number of times of switching, and from a thermal time constant of a power device unit.

The motor temperature obtaining unit 7 obtains a temperature of the motor. Specifically, the motor temperature obtaining unit 7 directly detects a temperature of the motor 30, or estimates a temperature of the motor 30 from an electric current flowing in the motor 30 to obtain a temperature of the motor 30. In one example method, a thermistor installed near a coil is used to obtain a temperature of the motor. In another example method, a temperature of the motor is estimated on the basis of an electric current value (feedback data) of the motor. When estimation is made on the basis of an electric current value, a temperature of the motor is estimated on the basis of heat generation by a copper loss (a loss proportional to the square of an electric current) of the motor, and a thermal time constant of the motor. To more accurately make estimation, heat generation by a copper loss is sometimes taken into account.

The power device temperature determination level storage unit 22 stores a power device temperature determination level. The motor temperature determination level storage unit 23 stores a motor temperature determination level.

The PWM frequency storage unit 21 stores at least two PWM frequencies that include a high PWM frequency higher than a specified PWM frequency, and include a low PWM frequency lower than the specified PWM frequency.

The power device temperature determining unit 8 determines whether or not a temperature of the power device is equal to or higher than the power device temperature determination level. The motor temperature determining unit 9 determines whether or not a temperature of the motor is equal to or higher than the motor temperature determination level.

The PWM frequency selecting unit 4 selects a PWM frequency to be given as a command to the inverter 3, from the specified PWM frequency and at least two PWM frequencies described above on the basis of determination results of the power device temperature determining unit 8 and the motor temperature determining unit 9. The PWM frequency selecting unit 4 selects an appropriate PWM frequency to control a power device temperature and a motor temperature. A power device temperature, a motor temperature, and a PWM frequency are related to each other as follows. A loss of the power device is proportional to an electric current value and the number of times of switching. Increasing a PWM frequency leads to increase in the number of times of switching per unit time. As a result, a loss for the same electric current value is increased. For this reason, decreasing a PWM frequency leads to a decrease in a loss so that a temperature of the power device can be decreased. An electric current necessary for the motor to generate a certain output is constant regardless of a PWM frequency. In PWM control, control is performed such that a certain electric current flows averagely. However, an actual electric current includes a harmonic wave component (ripple component) due to switching. The lower a PWM frequency is, the larger the ripple component is. As a loss of the motor, there is copper loss, core loss, and mechanical loss. When a ripple component is large, copper loss and core loss are large. For this reason, increasing a PWM frequency can cause a temperature of the motor to fall.

In accordance with determination results of the power device temperature determining unit 8 and the motor temperature determining unit 9, the PWM frequency selecting unit 4 selects a PWM frequency to be given as a command to the inverter 3, as follows.

Figure 3:
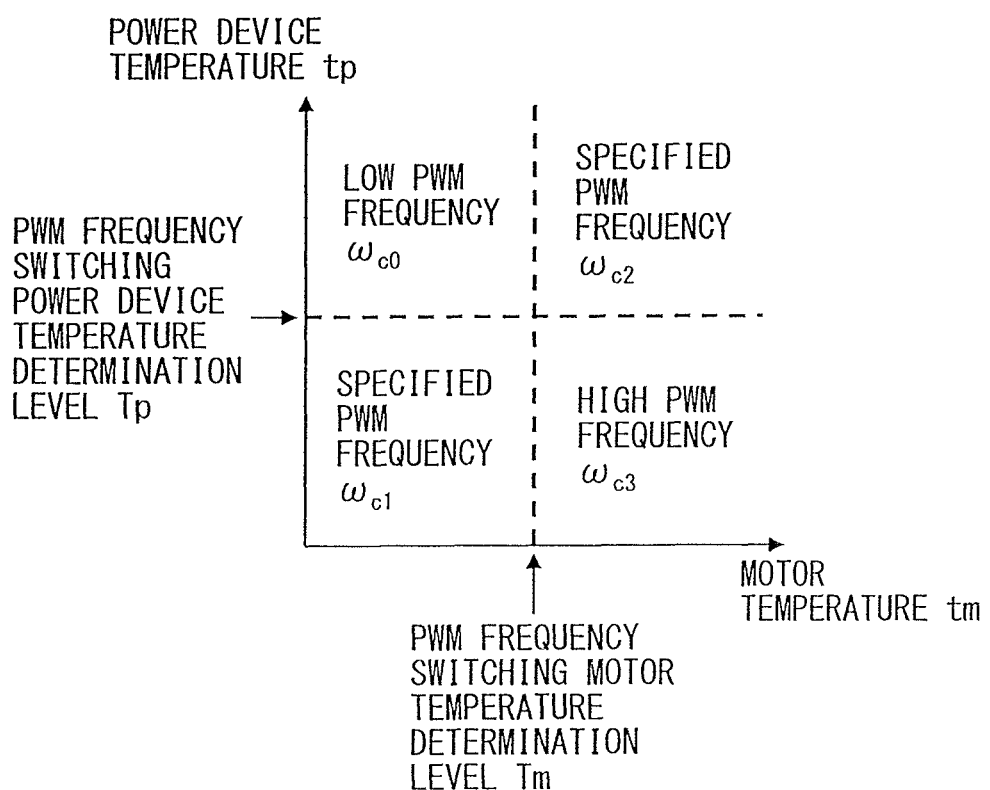
FIG. 3 illustrates relation among a power device temperature and a motor temperature and a PWM frequency in the motor control device according to the first embodiment of the present invention.

First, when a temperature of the power device is lower than the power device temperature determination level, and a temperature of the motor is lower than the motor temperature determination level, the PWM frequency selecting unit 4 selects the specified PWM frequency as a PWM frequency to be given as a command to the inverter 3. Specifically, as illustrated in FIG. 3, when the power device temperature tp is lower than the PWM frequency switching power device temperature determination level (simply referred to as "power device temperature determination level" in the following) Tp (tp<Tp), and the motor temperature tm is lower than the PWM frequency switching motor temperature determination level (simply referred to as "motor temperature determination level" in the following) Tm (tm<Tm), the PWM frequency selecting unit 4 selects, as a PWM frequency, the specified frequency $\omega_{c1}$ that is a value before a power device temperature and a motor temperature are obtained. In this case, the power device temperature tp and the motor temperature tm are kept lower than the power device temperature determination level Tp and the motor temperature determination level Tm, respectively. Accordingly, it is considered that a problem of excessive heating of the power device and the motor is not generated even when a PWM frequency for driving the motor is not changed. For this reason, a PWM frequency can be maintained as it is.

Secondly, when a temperature of the power device is lower than the power device temperature determination level, and a temperature of the motor is equal to or higher than the motor temperature determination level, the PWM frequency selecting unit 4 selects the high PWM frequency as a PWM frequency to be given as a command to the inverter 3. Specifically, as illustrated in FIG. 3, when the power device temperature tp is lower than the power device temperature determination level Tp (tp<Tp), and the motor temperature tm is equal to or higher than the motor temperature determination level Tm (tm≥Tm), the PWM frequency selecting unit 4 selects, as a PWM frequency, the high frequency $\omega_{c3}$ that is higher than a value before a power device temperature and a motor temperature are obtained. In this case, the power device temperature tp is lower than the power device temperature determination level Tp. Accordingly, a PWM frequency may be maintained. However, since the motor temperature tm is equal to or higher than the motor temperature determination level Tm, a PWM frequency is set to be higher than a PWM frequency before motor temperature measurement. Thus, the motor is driven at the high frequency to reduce a loss of the motor. Thereby, calorific power from the motor is reduced, and a temperature of the motor can be reduced.

Thirdly, when a temperature of the power device is equal to or higher than the power device temperature determination level, and a temperature of the motor is lower than the motor temperature determination level, the PWM frequency selecting unit 4 selects the low PWM frequency as a PWM frequency to be given as a command to the inverter 3. Specifically, as illustrated in FIG. 3, when the power device temperature tp is equal to or higher than the power device temperature determination level Tp (tp≤Tp), and the motor temperature tm is lower than the motor temperature determination level Tm (tm<Tm), the PWM frequency selecting unit 4 selects, as a PWM frequency, the low frequency $\omega_{c0}$ that is lower than a value before a power device temperature and a motor temperature are obtained. In this case, the motor temperature tm is lower than the motor temperature determination level Tm. Accordingly, a PWM frequency may be maintained. However, since the power device temperature tp is equal to or higher than the power device temperature determination level Tp, a PWM frequency is set to be lower than a PWM frequency before motor temperature measurement. Thus, the power device is driven at the low frequency.

Thereby, calorific power from the power device is reduced, and a temperature of the power device can be reduced.

Fourthly, when a temperature of the power device is equal to or higher than the power device temperature determination level, and a temperature of the motor is equal to or higher than the motor temperature determination level, the PWM frequency selecting unit 4 selects the specified PWM frequency as a PWM frequency to be given as a command to the inverter 3, and creates a signal for causing the warning communicating unit 13 to generate a warning. Specifically, as illustrated in FIG. 3, when the power device temperature tp is equal to or higher than the power device temperature determination level Tp (tp≥Tp), and the motor temperature tm is equal to or higher than the motor temperature determination level Tm (tm≥Tm), the PWM frequency selecting unit 4 selects, as a PWM frequency, the specified frequency $\omega_{c2}$. The frequency $\omega_{c2}$ may be the same as the frequency $\omega_{c1}$, or may be different from the frequency $\omega_{c1}$. For example, it is assumed that there are two prepared frequencies A[Hz] and B[Hz]. For the motor to which the above-described PWM control is applied, PWM is switched between "$\omega_{c1}$=A or B" and "$\omega_{c2}$=A or B" by a condition other than a temperature, in a region of the specified PWM frequencies. Accordingly, "$\omega_{c1} \neq \omega_{c2}$" and "$\omega_{c1} = \omega_{c2}$" are established. In this case, the power device temperature tp and the motor temperature tm are equal to or higher than the power device temperature determination level Tp and the motor temperature determination level Tm, respectively. Accordingly, decreasing a PWM frequency causes a motor temperature to rise, and increasing a PWM frequency causes a power device temperature to rise. In this case, there is concern that one of a power device temperature and a motor temperature comes to be in an overheat state that affects the operation. For this reason, the PWM frequency selecting unit 4 creates a signal for causing the warning communicating unit 13 to generate a warning.

The PWM frequency generating unit 5 generates a PWM frequency such that the generated frequency becomes the frequency selected by the PWM frequency selecting unit 4. The PWM frequency generating unit gives the generated PWM frequency as a command to the inverter 3.

The warning communicating unit 13 communicates a warning in accordance with the signal from the PWM frequency selecting unit 4, as described above.

Figure 4:
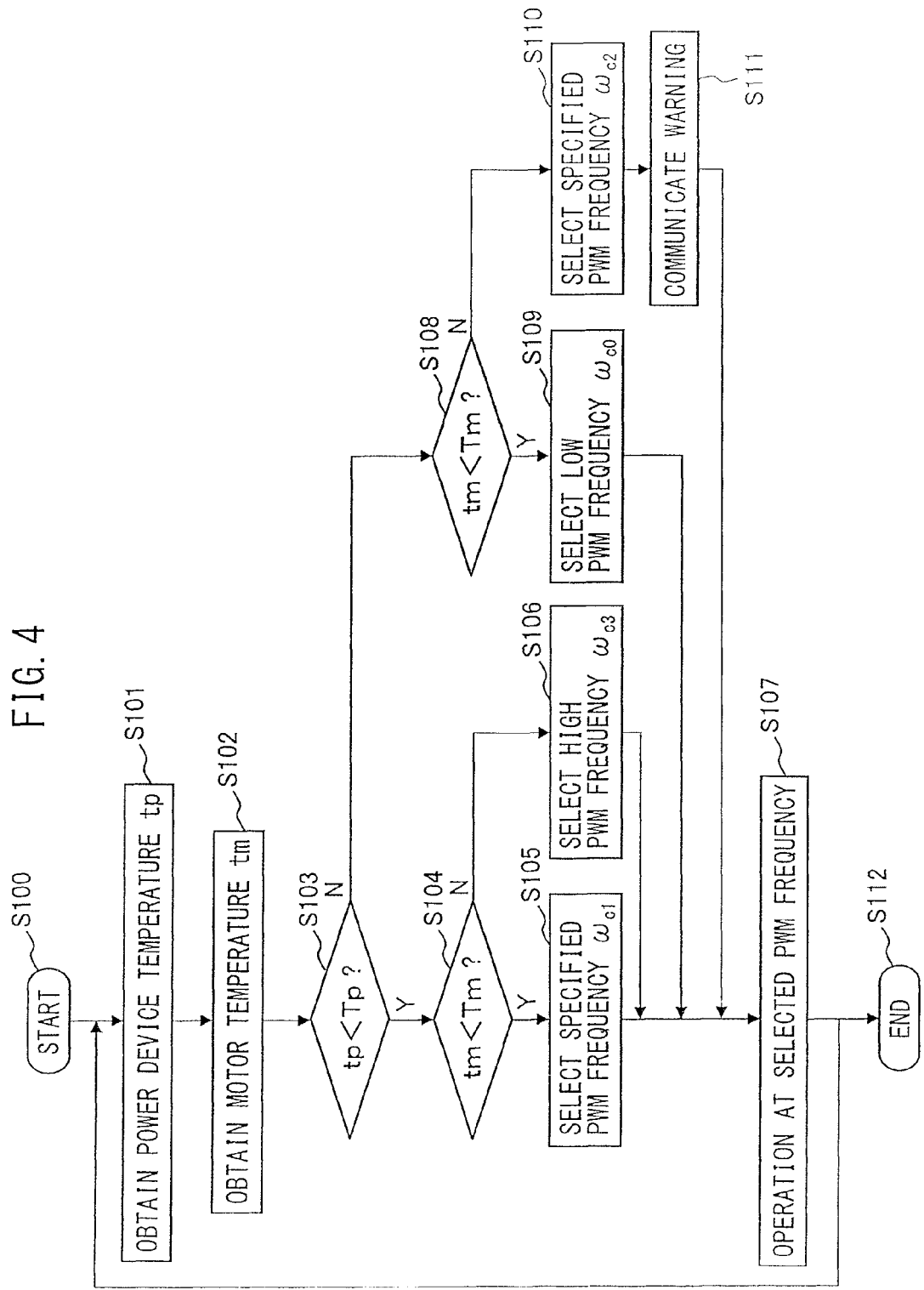
FIG. 4 is a flowchart for describing operation in the motor control device according to the first embodiment of the present invention.

Next, operation of the motor control device according to the first embodiment of the present invention is described. FIG. 4 illustrates a flowchart for describing the operation in the motor control device according to the first embodiment of the present invention. First, the motor control device 101 drives the motor 30 at the specified PWM frequency. At the step S101, the power device temperature obtaining unit 6 obtains a power device temperature tp. Next, at the step S102, the motor temperature obtaining unit 7 obtains a motor temperature tm.

Next, at the step S103, the power device temperature determining unit 8 obtains a power device temperature tp from the power device temperature obtaining unit 6, and obtains the power device temperature determination level Tp from the power device temperature determination level storage unit 22. Then, at the step S103, the power device temperature determining unit 8 compares, in terms of magnitude, the power device temperature tp with the power device temperature determination level Tp.

When the power device temperature tp is lower than the power device temperature determination level Tp (tp<Tp), at the step S104, the motor temperature determining unit 9 obtains a motor temperature tm from the motor temperature obtaining unit 7, and obtains the motor temperature determination level Tm from the motor temperature determination level storage unit 23. Then, at the step S104, the motor temperature determining unit 9 compares, in terms of magnitude relation, the motor temperature tm with the motor temperature determination level Tm.

When the motor temperature tm is lower than the motor temperature determination level Tm (tm<Tm), at the step S105, the PWM frequency selecting unit 4 selects the specified PWM frequency as a PWM frequency to be given as a command to the inverter 3 since the power device temperature tp is lower than the power device temperature determination level Tp (tp<Tp). Specifically, as illustrated in FIG. 3, the PWM frequency selecting unit 4 selects, as a PWM frequency, the specified PWM frequency $\omega_{c1}$ that is a value before a power device temperature and a motor temperature are obtained.

When the motor temperature tm is equal to or higher than the motor temperature determination level Tm (tm≥Tm), at the step S106, the PWM frequency selecting unit 4 selects the high PWM frequency as a PWM frequency to be given as a command to the inverter 3 since the power device temperature tp is lower than the power device temperature determination level Tp (tp<Tp). Specifically, as illustrated in FIG. 3, the PWM frequency selecting unit 4 selects, as a PWM frequency, the high PWM frequency $\omega_{c3}$ that is higher than a value before a power device temperature and a motor temperature are obtained.

When the power device temperature tp is equal to or higher than the power device temperature determination level Tp at the step S103 (tp≥Tp), at the step S108, the motor temperature determining 9 obtains a motor temperature tm from the motor temperature obtaining unit 7, and obtains the motor temperature determination level Tm from the motor temperature determination level storage unit 23. Then, the motor temperature determining 9 compares, in terms of magnitude relation, the motor temperature tm with the motor temperature determination level Tm.

When the motor temperature tm is lower than the motor temperature determination level Tm (tm<Tm), at the step S109, the PWM frequency selecting unit 4 selects the low PWM frequency as a PWM frequency to be given as a command to the inverter 3 since the power device temperature tp is equal to or higher than the power device temperature determination level Tp (tp≥Tp). Specifically, as illustrated in FIG. 3, the PWM frequency selecting unit 4 selects the low PWM frequency $\omega_{c0}$ that is lower than a value before a power device temperature and a motor temperature are obtained.

When the motor temperature tm is equal to or higher than the motor temperature determination level Tm (tm≥Tm), at the step S110, the PWM frequency selecting unit 4 selects the specified PWM frequency as a PWM frequency to be given as a command to the inverter 3 since the power device temperature tp is equal to or higher than the power device temperature determination level Tp (tp≥Tp). In this case, at the step S111, the PWM frequency selecting unit 4 further creates a signal for making the warning communicating unit 13 generate a warning. Specifically, as illustrated in FIG. 3, the PWM frequency selecting unit 4 selects the specified PWM frequency $\omega_{c2}$ as a PWM frequency.

After that, at the step S107, the PWM frequency selecting unit 4 communicates the selected PWM frequency to the PWM frequency generating unit 5, the PWM frequency generating unit 5 generates the PWM frequency for driving the inverter 3, and the motor 30 is driven. Then, the process returns to the step S101 to continue to drive the motor.

As described above, according to the motor control device of the first embodiment of the present invention, a PWM frequency for driving the inverter and the motor is determined in accordance with a power device temperature and a motor temperature. Accordingly, while a temperature of the power device and a temperature of the motor are adjusted simultaneously, the motor can be driven, and while a switching loss in the power device and a loss in the motor are controlled, the motor can be driven.

Second Embodiment

Figure 5:
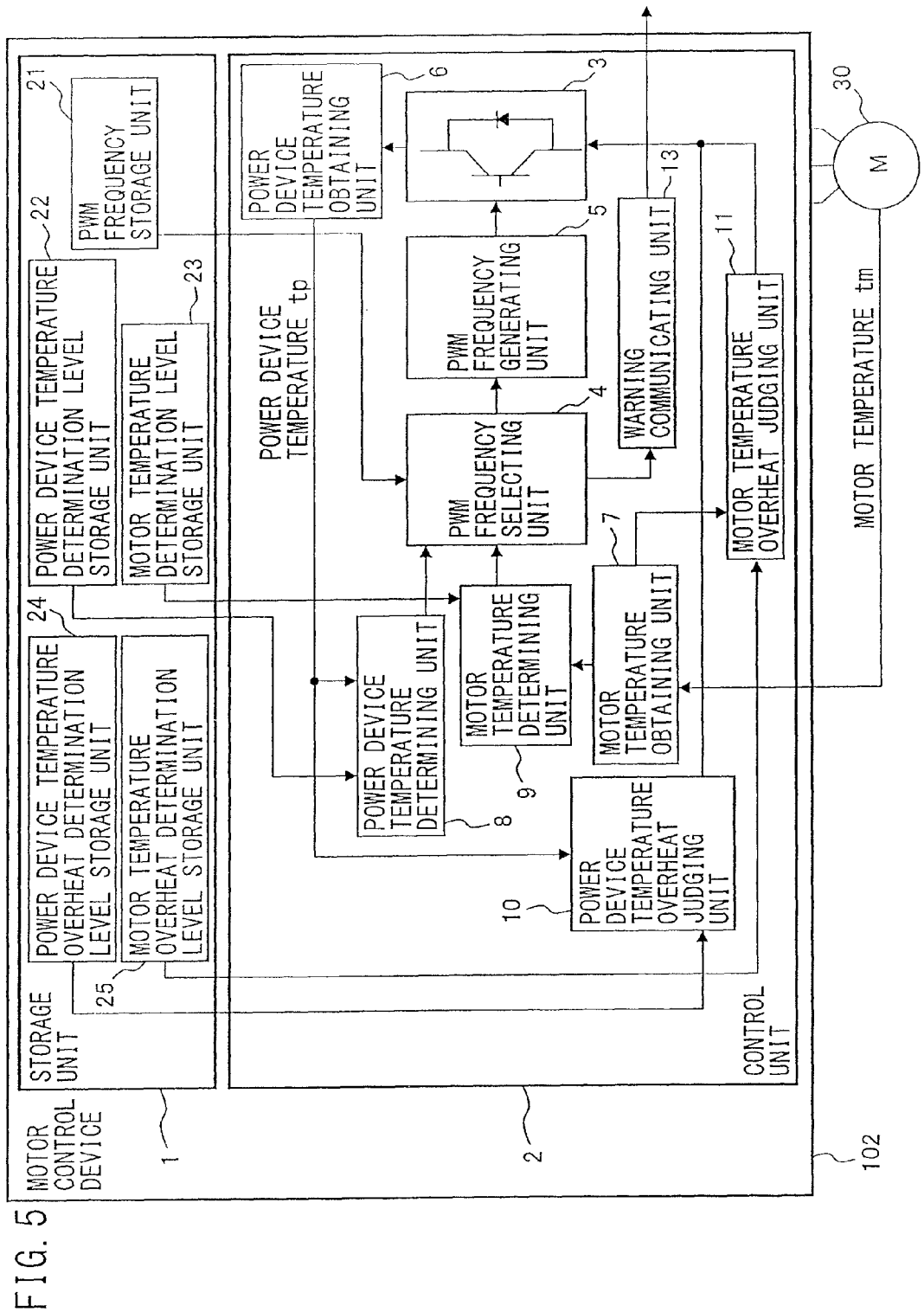
FIG. 5 illustrates a configuration of a motor control device according to a second embodiment of the present invention.

Next, a motor control device according to a second embodiment of the present invention is described. FIG. 5 illustrates a configuration of the motor control device according to the second embodiment. The motor control device 102 according to the second embodiment differs from the motor control device 101 of the first embodiment in that the motor control device 102 further includes a power device temperature overheat determination level storage unit 24 that stores a power device temperature overheat determination level, a motor temperature overheat determination level storage unit 25 that stores a motor temperature overheat determination level, a power device temperature overheat determining unit 10 that determines whether or not a temperature of the power device is equal to or higher than the power device temperature overheat determination level, and a motor temperature overheat determining unit 11 that determines whether or not a temperature of the motor is equal to or higher than the motor temperature overheat determination level, and on the basis of determination results of the power device temperature overheat determining unit 10 and the motor temperature overheat determining unit 11, the PWM frequency selecting unit 4 stops giving, to the inverter 3, a command for PWM frequency setting when a power device temperature is equal to or higher than the power device temperature overheat determination level, or when a motor temperature is equal to or higher than the motor temperature overheat determination level. The other configuration is the same as the configuration of the motor control device 101 according to the first embodiment, and accordingly, a detailed description of the other configuration is omitted.

Figure 6:
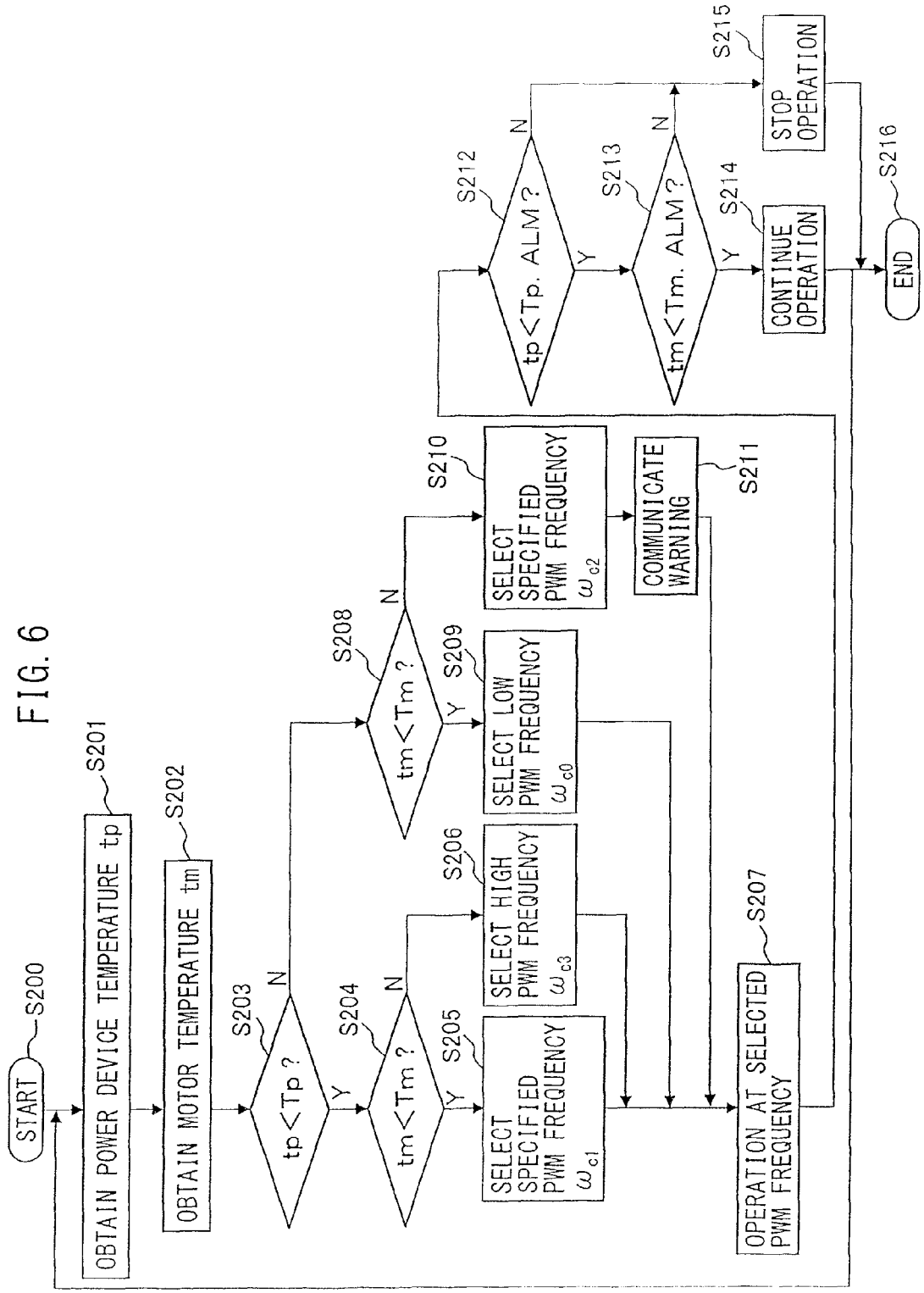
FIG. 6 is a flowchart for describing operation in the motor control device according to the second embodiment of the present invention.

Next, operation of the motor control device 102 according to the second embodiment is described. FIG. 6 illustrates a flowchart for describing the operation in the motor control device according to the second embodiment of the present invention. The steps S201 to S211 are the same as the steps S101 to S111 in the flowchart illustrated in FIG. 4 for the motor control device according to the first embodiment. Accordingly, a detailed description of the steps S201 to S211 is omitted.

At the step S212, the power device temperature overheat determining unit 10 compares in terms of magnitude, a power device temperature tp obtained from the power device temperature obtaining unit 6 with the power device temperature overheat determination level Tp.ALM obtained from the power device temperature overheat determination level storage unit 24.

When the power device temperature tp is equal to or larger than the power device temperature overheat determination level Tp.ALM, at the step S215, the motor control device 102 stops giving, to the inverter 3, a command for PWM frequency setting. Thereby, operation of the motor 30 is stopped.

When the power device temperature tp is lower than the power device temperature overheat determination level Tp.ALM at the step S212, at the step S213, the motor temperature overheat determining unit 11 compares in terms of magnitude, a motor temperature tm obtained from the motor temperature obtaining unit 7 with the motor temperature overheat determination level Tm.ALM obtained from the motor temperature overheat determination level storage unit 25.

When the motor temperature tm is equal to or higher than the motor temperature overheat determination level Tm.ALM, at the step S215, the motor control device 102 stops giving, to the inverter 3, a command for PWM frequency setting. Thereby, operation of the motor 30 is stopped.

When the motor temperature tm is lower than the motor temperature overheat determination level Tm.ALM, at the step S214, the motor control device 102 continues to operation of the motor.

As described above, according to the motor control device of the second embodiment, when it is determined that at least one of the power device and the motor is in an overheat state, operation of the motor can be stopped. Consequently, overheating can be appropriately avoided.

Third Embodiment

Figure 7:
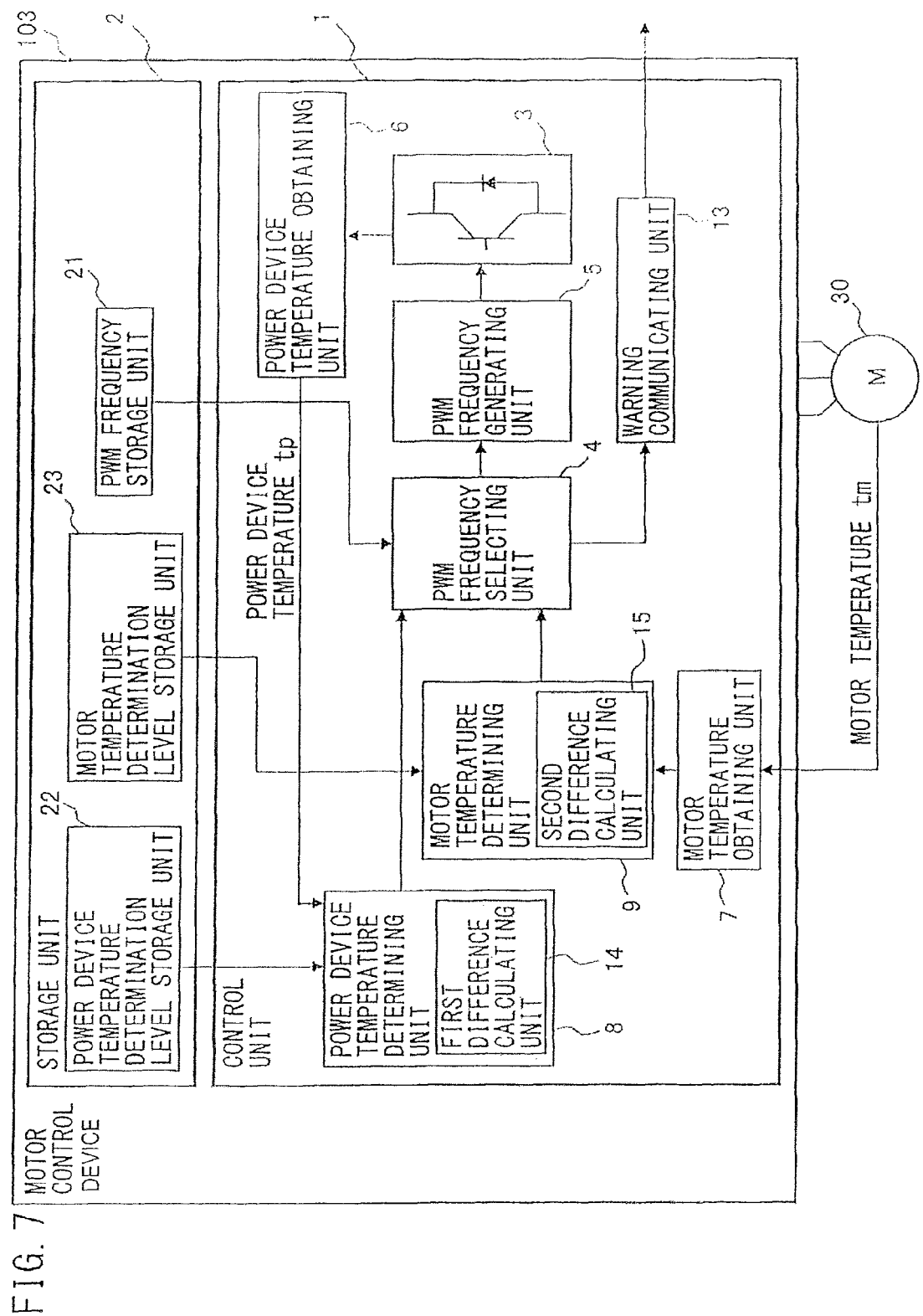
FIG. 7 illustrates a configuration of a motor control device according to a third embodiment of the present invention.

Next, a motor control device according to a third embodiment is described. FIG. 7 illustrates a configuration of the motor control device according to the third embodiment. The motor control device 103 according to the third embodiment differs from the motor control device 101 according to the first embodiment in that the motor control device 103 further includes a first difference calculating unit 14 that calculates a power device temperature difference, i.e., a difference between a power device temperature and the power device temperature determination level, and a second difference calculating unit 15 that calculates a motor temperature difference, i.e., a difference between a motor temperature and the motor temperature determination level, and the PWM frequency selecting unit 4 selects the low PWM frequency when a power device temperature difference is equal to or higher than a motor temperature difference, and selects the high PWM frequency when a power device temperature is lower than a motor temperature difference. The other configuration is the same as the configuration of the motor control device 101 according to the first embodiment, and accordingly, detailed description of the other configuration is omitted.

Figure 8:
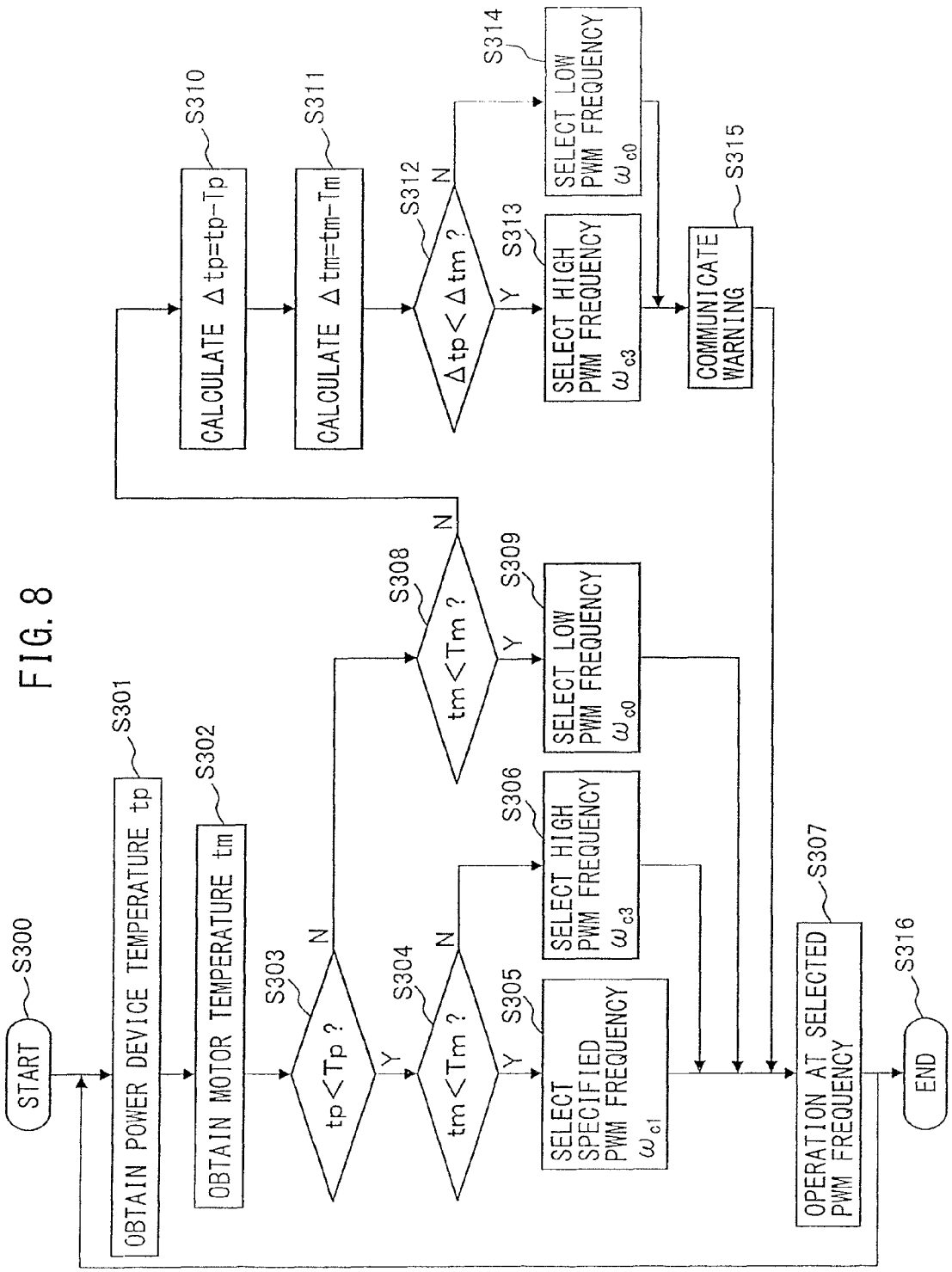
FIG. 8 is a flowchart for describing operation in the motor control device according to the third embodiment of the present invention.

Next, operation of the motor control device 103 according to the third embodiment is described. FIG. 8 illustrates a flowchart for describing the operation in the motor control device according to the third embodiment of the present invention. The steps S301 to S309 are the same as the steps S101 to S109 in the flowchart illustrated in FIG. 4 for the motor control device according to the first embodiment. Accordingly, detailed description of the steps S301 to S309 is omitted.

When a power device temperature tp is equal to or higher than the power device temperature determination level Tm at the step S303, and a motor temperature tm is equal to or higher than the motor temperature determination level Tm at the step S308, at the step S310, the first difference calculating unit 14 calculates a power device temperature difference $\Delta tp = tp - Tp$ that is a difference between the power device temperature tp obtained from the power device temperature obtaining unit 6 and the power device temperature determination level Tp obtained from the power device temperature determination level storage unit 22.

Next, at the step S311, the second difference calculating unit 15 calculates a motor temperature difference $\Delta tm = tm - Tm$ that is a difference between the motor temperature tm obtained from the motor temperature obtaining unit 7 and the motor temperature determination level Tm obtained from the motor temperature determination level storage unit 23.

Subsequently, at the step S312, the PWM frequency selecting unit 4 compares, in terms of magnitude, the power device temperature difference Δtp obtained from the first difference calculating unit 14 with the motor temperature difference Δtm obtained from the second difference calculating unit 15. When the power device temperature difference Δtp is equal to or higher than the motor temperature difference Δtm, at the step S314, the PWM frequency selecting unit 4 selects the low PWM frequency $\omega_{c0}$ from the PWM frequencies stored in the PWM frequency storage unit 21. Thereby, the motor temperature tm rises, and on the contrary, the power device temperature tp falls. In this case, the power device temperature difference Δtp is equal to or larger than the motor temperature difference Δtm. For this reason, the low PWM frequency $\omega_{c0}$ is selected to decrease the power device temperature difference Δtp so that a margin for the power device temperature tp to reach the overheat level can be earned, and the power device temperature tp can be prevented from reaching an overheat state. Consequently, time necessary for reaching the overheat state can be secured.

When the power device temperature difference Δtp obtained from the first difference calculating unit 14 is lower than the motor temperature difference Δtm obtained from the second difference calculating unit 15 at the step S312, at the step S313, the PWM frequency selecting unit 4 selects the high PWM frequency $\omega_{c3}$. Thereby, the power device temperature tp rises, and on the contrary, the motor temperature tm falls. In this case, the motor temperature difference Δtm is equal to or larger than the power device temperature difference Δtp. For this reason, the high PWM frequency $\omega_{c3}$ is selected to decrease the motor temperature difference Δtm so that a margin for the motor temperature tm to reach the overheat level can be earned, and the motor temperature tm can be prevented from reaching an overheat state. Consequently, time necessary for reaching the overheat state can be secured.

As described above, according to the motor control device of the third embodiment, heat generation in the entire motor control device can be prevented. Accordingly, while overheat can be avoided, use of the motor control device can be maximized, and long time operation is possible.

In the described example in the above embodiments, two frequencies, i.e., the high PWM frequency higher than the specified PWM frequency, and the low PWM frequency lower than the specified PWM frequency are stored in the PWM frequency storage unit, and the PWM frequency selecting unit selects one PWM frequency from the specified PWM frequency and the two PWM frequencies stored in the PWM frequency storage unit. However, the number of the PWM frequencies stored in the PWM frequency storage unit is not limited to two, and may be three or more.

What is claimed is:

1. A motor control device, comprising:
   an inverter configured to invert DC voltage into AC voltage at a specified PWM frequency by PWM control using a power device to apply the AC voltage to a motor;
   a power device temperature obtaining unit configured to obtain a temperature of the power device of the inverter;
   a motor temperature obtaining unit configured to obtain a temperature of the motor;
   a power device temperature determination level storage unit configured to store a power device temperature determination level;
   a motor temperature determination level storage unit configured to store a motor temperature determination level;
   a PWM frequency storage unit configured to store at least two PWM frequencies including a high PWM frequency higher than the specified PWM frequency, and a low PWM frequency lower than the specified PWM frequency;
   a power device temperature determining unit configured to determine whether or not the temperature of the power device is equal to or higher than the power device temperature determination level;
   a motor temperature determining unit configured to determine whether or not the temperature of the motor is equal to or higher than the motor temperature determination level; and
   a PWM frequency selecting unit configured to select a PWM frequency to be given as a command to the inverter, from the specified PWM frequency and the at least two PWM frequencies on the basis of determination results of the power device temperature determining unit and the motor temperature determining unit,
   wherein when the temperature of the power device is lower than the power device temperature determination level, and the temperature of the motor is lower than the motor temperature determination level,
      the PWM frequency selecting unit is configured to select the specified PWM frequency as the PWM frequency to be given as the command to the inverter,
   wherein when the temperature of the power device is lower than the power device temperature determination level, and the temperature of the motor is equal to or higher than the motor temperature determination level,
      the PWM frequency selecting unit is configured to select the high PWM frequency as the PWM frequency to be given as the command to the inverter,
   wherein when the temperature of the power device is equal to or higher than the power device temperature determination level, and the temperature of the motor is lower than the motor temperature determination level,
      the PWM frequency selecting unit is configured to select the low PWM frequency as the PWM frequency to be given as the command to the inverter, and
   wherein when the temperature of the power device is equal to or higher than the power device temperature determination level, and the temperature of the motor is equal to or higher than the motor temperature determination level,
      the PWM frequency selecting unit is configured to select the specified PWM frequency as the PWM frequency to be given as the command to the inverter, and create a signal for generating a warning.

2. The motor control device according to claim 1, further comprising:
   a power device temperature overheat determination level storage unit configured to store a power device temperature overheat determination level;
   a motor temperature overheat determination level storage unit configured to store a motor temperature overheat determination level;
   a power device temperature overheat determining unit configured to determine whether or not the temperature of the power device is equal to or higher than the power device temperature overheat determination level; and
   a motor temperature overheat determining unit configured to determine whether or not the temperature of the motor is equal to or higher than the motor temperature overheat determination level,
   wherein on the basis of determination results of the power device temperature overheat determining unit and the motor temperature overheat determining unit, the PWM frequency selecting unit is configured to stop giving, to the inverter, the command for PWM frequency setting
when the temperature of the power device is equal to or higher than the power device temperature overheat determination level, or
when the temperature of the motor temperature is equal to or higher than the motor temperature overheat determination level.

3. The motor control device according to claim 1, further comprising:
a first difference calculating unit configured to calculate a power device temperature difference that is a difference between the temperature of the power device and the power device temperature determination level; and
a second difference calculating unit configured to calculate a motor temperature difference that is a difference between the temperature of the motor and the motor temperature determination level,
wherein when the power device temperature difference is equal to or higher than the motor temperature difference, the PWM frequency selecting unit is configured to select the low PWM frequency, and
wherein when the power device temperature difference is lower than the motor temperature difference, the PWM frequency selecting unit is configured to select the high PWM frequency.

* * * * *